United States Patent [19]

Lorenz

[11] 4,160,753

[45] Jul. 10, 1979

[54] PROCESS FOR THE PRODUCTION OF POLYAMIDE-POLYUREAS AND DISPERSIONS THEREOF IN WATER

[75] Inventor: Otto Lorenz, Roetgen-Rott, Fed. Rep. of Germany

[73] Assignee: Bayer Aktiengesellschaft, Leverkusen, Fed. Rep. of Germany

[21] Appl. No.: 848,970

[22] Filed: Nov. 7, 1977

Related U.S. Application Data

[63] Continuation of Ser. No. 592,589, Jul. 2, 1975, abandoned.

[30] Foreign Application Priority Data

Jul. 26, 1974 [DE] Fed. Rep. of Germany ....... 2436017

[51] Int. Cl.$^2$ .................. C08G 18/32; C08G 18/30; C08J 3/02
[52] U.S. Cl. ................. 260/29.2 TN; 260/29.2 N; 528/73
[58] Field of Search .................. 260/77.5 R, 29.2 TN, 260/29.2 N; 528/73

[56] References Cited

U.S. PATENT DOCUMENTS

| | | | |
|---|---|---|---|
| 3,461,103 | 8/1969 | Keberle et al. ..................... 260/75 |
| 3,518,230 | 6/1970 | Sheffer et al. ..................... 260/65 |
| 3,578,639 | 5/1971 | Sheffer ............................. 528/73 |
| 3,658,773 | 4/1972 | Zecher et al. ..................... 528/73 |
| 3,669,937 | 6/1972 | Zecher et al. ................. 260/77.5 R |
| 3,699,075 | 10/1972 | Lubowitz ......................... 260/49 |
| 3,708,458 | 1/1973 | Alberino et al. .................. 260/65 |
| 3,716,519 | 2/1973 | Yoda et al. ................... 260/47 CB |
| 3,817,926 | 6/1974 | Pauze et al. ..................... 260/65 |
| 3,853,813 | 12/1974 | Edelman et al. .............. 260/47 CB |

OTHER PUBLICATIONS

Saunders et al., Polyurethanes, Part I, Interscience, N.Y. (1962), pp. 273-275.

*Primary Examiner*—H. S. Cockeram
*Attorney, Agent, or Firm*—Gene Harsh; Joseph C. Gil; R. Brent Olson

[57] ABSTRACT

The instant invention relates to a process for the production of polyureas wherein solutions of organic polyisocyanates are reacted with primary and/or secondary organic polyamines in the presence of tetracarboxylic acid dianhydrides. The polyisocyanates used are preferably difunctional linear prepolymers containing terminal isocyanate groups, while the amines used are preferably diamines. The resultant product, which contains carboxyl groups, may then be neutralized and dispersed in water.

11 Claims, No Drawings

PROCESS FOR THE PRODUCTION OF POLYAMIDE-POLYUREAS AND DISPERSIONS THEREOF IN WATER

This is a continuation of application Ser. No. 592,589 filed July 2, 1975 and now abandoned.

BACKGROUND OF THE INVENTION

In one known process, polyurethanes containing inter alia terminal hydroxyl and/or amino groups are reacted with cyclic carboxylic acid anhydrides such as benzene tetracarboxylic acid anhydride, in order to introduce into the polyurethane carboxylic acid groups capable of salt formation (see e.g., German Pat. No. 1,237,306).

It is also known that polyurethane ionomers can be produced from prepolymers. Anionic segmented polyurethane ionomers can thus be produced by reacting NCO-terminated prepolymers with bifunctional anionic chain extenders such as diamino or dihydroxy carboxylic acids in accordance with the following equation (see, e.g. German Offenlegungsschrift 1,544,892):

OCN ~ NCO + H₂N—⊤—NH₂ ⟶
             COOH
  —CO—NH  NH—CO—NH—⊤—NH—
                    COOH

Unfortunately, this reaction is difficult to control because the free carboxyl groups are able to react with the isocyanate groups. In some cases, insoluble internal salts are even formed. Accordingly, the anionic component is preferably used in the form of the sodium or potassium salt. The chain extension of NCO-prepolymers with salts of aliphatic diamino carboxylic acids has proved to be the most favorable in this case, polyaddition to form the macromolecule taking place over a short period.

Accordingly, the object of the instant invention is to provide a simplified process for the production of polyureas which results in polyadducts which contain free carboxyl groups and which may be converted into polyureas dispersible in water by simply forming salts from these free carboxyl groups by treatment with suitable bases.

DESCRIPTION OF THE INVENTION

The instant invention is directed to a process for producing polyureas comprising reacting organic polyisocyanates, preferably difunctional NCO-prepolymers having a relatively high molecular weight, with primary and/or secondary polyamines and preferably diamines in the presence of tetracarboxylic acid dianhydrides. This reaction results in the formation of polyureas, which in addition to urea segments contain amide groups, and, when NCO-prepolymers containing urethane groups are used, urethane groups in the polymer chain.

In cases where difunctional diisocyanates, especially difunctional NCO-prepolymers, are used, the process of the instant invention surprisingly results in the formation of linear, segmented polyureas having carboxyl groups which are directly situated on the main chain and are non-statistically arranged. The polyadducts synthesized in this way show extremely favorable elastic properties which may be commercially exploited. In particular, high-quality coatings can be readily obtained from these plastics. The number of reactive hydrogen atoms may readily be selected in such a way that build-up of the corresponding macromolecule results in a substantially linear end product, which is often ideal for optimum elastomeric behavior.

The reaction is accompanied by the formation through ring cleavage, of carboxyl groups which can be converted into the corresponding salts by the addition of bases. In order to better illustrate the instant invention, the reaction of an NCO-terminated prepolymer with a diamine containing two primary amino groups in the presence of a pyromellitic acid dianhydride may be described as follows:

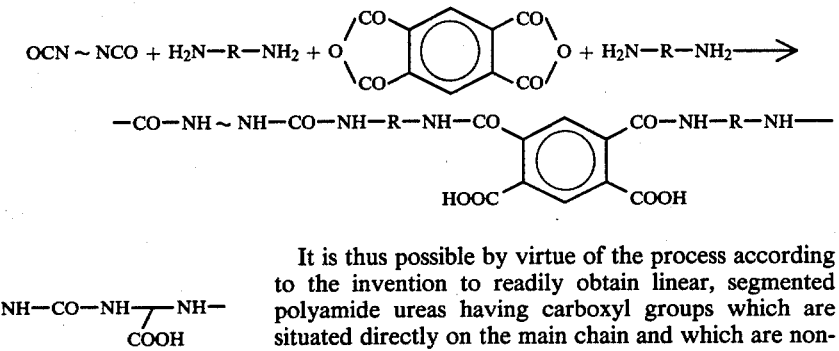

It is thus possible by virtue of the process according to the invention to readily obtain linear, segmented polyamide ureas having carboxyl groups which are situated directly on the main chain and which are non-statistically arranged, and which may be converted into the corresponding carboxylate anions by a simple neutralization reaction.

The following compounds are particularly suitable starting compounds for use in the process of the instant invention:

(a) NCO-prepolymers having preferably two terminal isocyanate groups and molecular weights in the range from 400 to 10,000, preferably from 800 to 4,000, of the type obtainable in known manner by reacting excess quantities of low molecular weight diisocyanates with difunctional compounds (in the context of the isocyanate-polyaddition reaction) having terminal groups reactive to isocyanate groups and molecular weights in the range from 62 to 10,000, preferably from 500 to 4,000. Suitable compounds of this kind, containing groups reactive to isocyanate groups, include dihydroxy polyesters and dihydroxy polyethers of the type generally known and having molecular weights in the range specified. Examples of these known compounds may be found, for example, in U.S. Pat. No. 3,479,310 at column 2, line 55 to column 3, line 34. Simple polyols, and preferably glycols such as ethylene glycol, diethylene glycol, 1,2-propane diol or 1,3-propane diol are also suitable. Examples of suitable diisocyanates include any of the low molecular weight diisocyanates commonly encountered in polyurethane chemistry and include those of the type described for example in U.S. Pat. No. 3,479,310 at column 3, lines 55 to 63.

(b) Primary or secondary diamines of the formula $(R)_n(NHR')_2$, in which R represents a divalent aliphatic hydrocarbon radical with 2 to 18 carbon atoms, a divalent aromatic hydrocarbon radical with 6 to 15 carbon atoms, a divalent cycloaliphatic hydrocarbon radical with 5 to 15 carbon atoms or a divalent araliphatic hydrocarbon radical with 8 to 18 carbon atoms, and R' represents hydrogen or an aliphatic hydrocarbon radical with 1 to 4 carbon atoms, and n=0 or 1. Examples of diamines of this type include ethylene diamine, N,N'-dimethylethylene diamine, hexamethylene diamine, N,N'-di-n-butylhexamethylene diamine, 1,4-cyclohexylene diamine, benzidine, diamino diphenylmethane, perhydrodiamine diphenylmethane, the isomeric phenylene diamines, hydrazine, N,N'-dimethyl hydrazine, p-xylylene diamine or 1-amino-3,3,5-trimethyl-5-aminomethyl cyclohexane.

(c) Tetracarboxylic acid dianhydrides:

(1) Pyromellitic acid dianhydride (1,2,4,5-benzene tetracarboxylic acid dianhydride);

(2) Bicyclo-(2,2,2)-oct-(7)-ene-2,3,5,6-tetracarboxylic acid-2,3:5,6-dianhydride;

(3) Perylene-3,4,9,10-tetracarboxylic acid dianhydride;

(4) Naphthalene tetracarboxylic acid dianhydride;

(5) Tetracarboxylic acid anhydrides of the following formulae

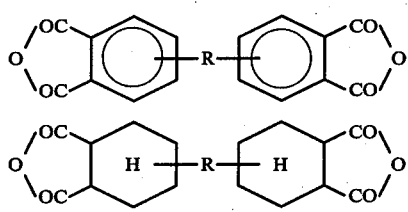

in which R represents a $C_1$-$C_{12}$-alkylene, —CO—, —O—, —S—, —$SO_2$-bridge, the alkylene bridge optionally also containing hetero atoms. In other words, the alkylene group may be attached to the rings through ester groups. Pyromellitic acid anhydride, benzophenone tetracarboxylic acid dianhydride and esters of trimellitic acid anhydride with simple glycols of the type mentioned in (a) are preferred. Corresponding esters of trimellitic acid anhydride with triols, such as, for example, trimethylolpropane trimellitate trisanhydride, may also be used in corresponding proportions in cases where branched molecular structures are required.

(d) Inorganic or organic bases for optionally converting the free carboxyl groups into carboxylate anions including monofunctional primary, secondary or tertiary amines such as, methylamine, triethylamine, dimethylamine, tributylamine, pyridine, aniline, diethanolamine and triethanolamine; or inorganic bases such as ammonia, sodium hydroxide, potassium hydroxide, sodium carbonate, potassium carbonate or sodium hydrogen carbonate.

To carry out the process of the invention, the polyisocyanate (a) is preferably dissolved together with the tetracarboxylic acid dianhydride (c) in a suitable solvent. The polyamine (b), preferably also dissolved, is added dropwise with stirring to the resulting solution at 10° to 100° C., preferably at 20° to 60° C. The quantitative ratios in which the reactants are used are selected in such a way that from 0.05 to 0.6, preferably from 0.1 to 0.5, acid anhydride groups and from 0.4 to 4, preferably from 0.8 to 2.5, NCO-groups are used per amino group during the reaction. Suitable solvents include any solvents which are inert under the reaction conditions and which boil at temperatures in the range from 30° to 200° C., preferably from 40° to 80° C. It is preferred, especially in cases where it is intended to convert the end products into the form of an aqueous dispersion, to use water-miscible solvents boiling at temperatures below 100° C. Suitable solvents include methylene chloride, acetone, methylethyl ketone, methylene isobutyl ketone, ethylacetate, butylacetate, dimethylformamide, dioxan, tetrahydrofuran, toluene and xylene. The use of acetone as a solvent is particularly preferred.

In order to convert the end products of the process of the instant invention into an aqueous dispersion, it is advisable to conduct the reaction in the presence of acetone as a solvent. The end products obtained are then at least partly neutralized by the addition of a suitable quantity of a base (d) which is preferably used in the form of an aqueous solution. The required quantity of water is then added and the acetone distilled off, preferably in vacuo.

In the preparation of aqueous plastics dispersions, the carboxylate group content of the dispersed polyadducts can be adjusted preferably to between 0.05 and 2 and, more particularly, to between 0.3 and 1.7% by weight of $COO^{(-)}$-groups, based on solids, by appropriately selecting the quantity of dianhydride and/or the degree of neutralization of the carboxyl groups formed.

Accordingly, it is possible by virtue of the instant process to readily produce new isocyanate-polyaddition products having free carboxylic acid groups which may be used as intermediate products for producing the corresponding aqueous plastics dispersions. The fact that the process is easy to carry out is surprising. It had not been expected that the tetracarboxylic acid dianhydrides could be incorporated into the polymer chain through amide groups because of the known differences in the reactivity of amines to isocyanate groups on the one hand and to carboxylic acid anhydride groups on the other, and because of the large NCO-excess present at least at the beginning of the process. On the contrary, the much quicker NCO/NH-reaction had been expected to yield linear amide-group-free polyureas in a first stage which in turn had been expected to react in a second reaction stage with the more sluggishly reacting tetracarboxylic acid dianhydride present accompanied by crosslinking (crosslinking by reaction of the dianhydride with the urea and urethane groups present in the polymer chain) to form insoluble and, hence, largely unusable polyaddition products.

The plastics dispersions which may be obtained from the end products of the process according to the invention are suitable for use in a number of interesting fields of application, such as for coating and impregnating flexible sheet structures such as textiles, leather, paper, wood or metal.

The invention is further illustrated, but is not intended to be limited by the following examples in which all parts and percentages are by weight unless otherwise specified.

EXAMPLE 1

47.6 g of 2,2,4-trimethyl hexamethylene diisocyanate are added with stirring at 80° C. to 250 g of an adipic acid-hexane diol-neopentyl glycol polyester of molecular weight 2000 (OH-number 56) which had previously been dehydrated in vacuo at 120° C. The melt is heated to 115°–120° C. and kept at that temperature for a period of 2 hours. The reaction mixture is stirred with 400 ml of acetone under heat, resulting in the formation of a clear solution. 7.37 g of pyromellitic acid dianhydride in 170 ml of acetone are added, and then 4.05 g of ethylene diamine dissolved in 125 ml of acetone are slowly added dropwise, the temperature in the reaction vessel being 56° C. The reaction mixture is then stirred for approximately 20 minutes, after which a solution of 4.37 g of KOH in 417 g of deionized water are added with intensive stirring at 55° to 60° C. This results in the formation of a stable dispersion which is partly freed from acetone in vacuo at 45° C., so that a latex having a viscosity of about 40 cP (20° C.) is ultimately obtained.

EXAMPLE 2

The procedure is as in Example 1, except that 38.0 g of hexamethylene diisocyanate are used instead of 2,2,4-trimethyl-hexamethylene diisocyanate. The polyurethane latex formed has a viscosity of about 60 cP at 20° C.

EXAMPLE 3

The procedure is as in Example 2, except that 16.38 g of 2,2-bis-(cyclohexylamine)-propane are used instead of 4.05 g of ethylene diamine. The dispersion obtained has a viscosity of about 150 cP at 20° C.

Mechanical properties of films prepared from the dispersions obtained in accordance with Examples 1 to 3 are set out in the following Table.

Table

| | Mechanical properties of films | | | | |
|---|---|---|---|---|---|
| | Strain at 300% elongation kp/cm$^2$ | | Permanent elongation % | Breaking strength kp/cm$^2$ | Breaking elongation % |
| Example | 1st strength | 6th strength | | | |
| 1 | 13.9 | 11.6 | 27.5 | 154 | 1125 |
| 2 | 37.0 | 32.8 | 12.5 | 209 | 770 |
| 3 | 44.7 | 35.7 | 29.4 | 140 | 705 |

EXAMPLE 4

4.1 Starting Substances

A polyester of adipic acid, 1,6-hexane diol and 2,2-dimethyl-1,3-propane diol ($\overline{M}_n = 2000$) was used as the macroglycol. Standard commercial-grade 1,6-hexamethylene diisocyanate (HMDI) was used as the diisocyanate. Purified pyromellitic acid dianhydride (PMDA), m.p. 278°–280° C., which showed hardly any or only very little discoloration when heated to its melting point, and ethylene diamine (EDA) were used as chain extenders.

4.2 Preparation of the Dispersion

A dispersion is prepared as follows: 61.4 g (0.365 mol) of HMDI are added with stirring at 80° C. to 400 g (0.2 mol) of the dehydrated polyester. The mixture is heated to 120° C. and then left for 2 hours to react at that temperature. Approximately, 640 ml of acetone are added under heat to the NCO-prepolymer formed, resulting in the formation of a clear solution. 11.85 g (0.0543 mol) of PMDA dissolved in 280 ml of acetone are then quickly added dropwise. 6.52 g (0.1085 mol) of EDA dissolved in 200 ml of acetone are then slowly added dropwise, the temperature in the reaction vessel being 56° C. This results in the formation of a relatively low-viscosity emulsion which shows only a slight tendency to thicken in the event of prolonged stirring. After stirring for approximately 60 minutes, a solution of 6.1 g (0.108 mol) of KOH in 670 g of deionized water is added to the reaction mixture with intensive stirring at 55° to 60° C. The rate at which the aqueous KOH is added should not be any lower than 50 g per minute otherwise the polymer might precipitate or a viscous emulsion might form. The rate at which the aqueous KOH is added is also governed by the size of the batch. It has proved to be advantageous for the addition to be made as quickly as possible. A low-viscosity stable dispersion is ultimately obtained after approximately 400 g of the aqueous KOH have been added, through phase reversal following a considerable increase in viscosity, the dispersion being partly or completely freed from acetone in vacuo at 45° C.

4.3 Analytical Methods

1. Determining the COOH-groups:

Approximately 40 g of the emulsion of the polymer in acetone where dissolved in twice the volume of dimethylsulphoxide (DMSO) after the chain-extending stage, resulting in the formation of a clear solution. The concentration of the COOH-groups was determined by titration with 1 n methanolic KOH using bromocresol purple as indicator.

2. Determining the NCO-groups:

Volumetric determination. Approximately 40 g of the emulsion of the polymer in acetone were dissolved in twice the volume of a mixture of dehydrated DMSO and chlorobenzene (1:1 vol), followed by the addition of 20 ml of 1 n dibutylamine solution in chlorobenzene. The NCO-groups were determined in known manner by back-titrating the amine excess with 1 n aqueous HCl using bromophenol blue as indicator. The emulsion formed did not interfere with the recognition of the end point.

4.4 Discussion of the Test Results

Chemical Synthesis

The reaction of a linear macroglycol containing terminal hydroxyl groups with excess diisocyanate results in the formation of an NCO-terminated prepolymer which is reacted with diamines in the presence of pyromellitic acid dianhydride. Chain extension is accompanied by the formation of an emulsion which forms stable dispersions after the addition of a dilute aqueous solution of a base. The aqueous dispersion is formed by phase reversal. In other words, a viscous water-in-polymer dispersion is initially formed, changing at a certain water content into a low-viscosity polymer-in-water dispersion.

Where the selected procedure is adopted, namely, adding pyromellitic acid dianhydride and then ethylene diamine to the acetone solution of the NCO-prepolymer, the molar ratio of EDA to PMDA being 2, and a dispersion subsequently formed by adding an aqueous KOH, various reactions may take place simultaneously or one after another:

(a) The reaction of EDA with PMDA in a molar ratio of 2:1 to form a chain extender (IV) which subsequently further reacts with the NCO-prepolymer (V) to form the polyamide urea urethane (VI):

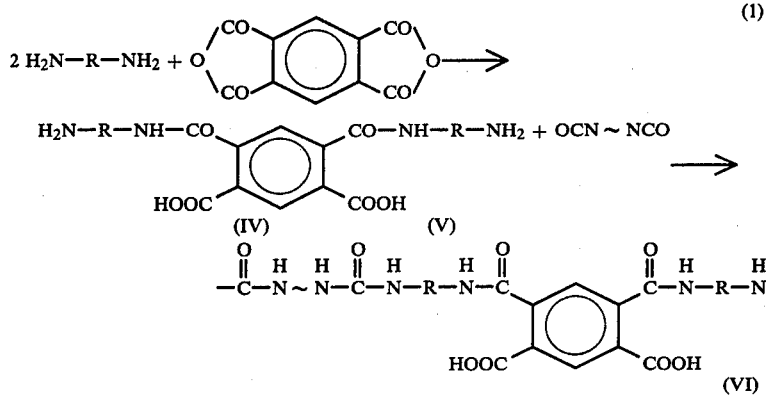

If the diamine excess is reduced, formation of the 1:1 adduct of EDA and PMDA would not be impossible; this would have a chain-terminating effect.

(b) Reacting EDA with the NCO-prepolymer to form a polyurea urethane (VII) which can subsequently further react with PMDA through the urea groups, accompanied by ureido formation, resulting in the formation of a crosslinked product (VIII)

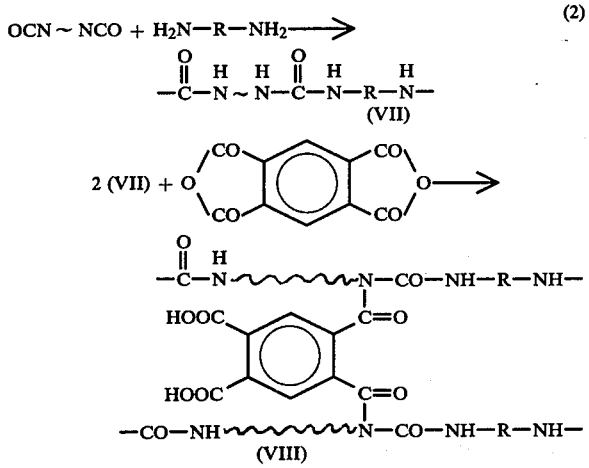

In this case, PMDA would be used as crosslinking agent, although the reaction of an anhydride with a urea group is much slower than with an amino group.

In order to be able to make statements on the structure of the macromolecule, the NCO- and COOH-content were quantitatively determined after chain extension. The results of the analysis are compared with the calculated NCO- and COOH-contents in the following Table. As can be seen from that Table, it is not possible by carboxyl group analysis to distinguish between reactions (1) and (2). However, this is possible by NCO-analysis. As the results show, the experimentally determined values and the values calculated for reaction (1) are fairly consistent with one another. Accordingly, the macromolecule can be regarded as a polyamide urea urethane (VI) of substantially linear structure. The NCO-values found are only slightly lower than the calculated values. It may be regarded as surprising that the polyurea urethane described in (2) is not formed.

Table

Comparison of experimentally determined and calculated NCO— and COOH-contents after chain extension

| Quantity of adducts used in mols | | NCO— and COOH-content in mols of the acetone solution | | | |
|---|---|---|---|---|---|
| | | | calculated | found in hours after production[c] | |
| | | | | 1 | 24 | 120 |
| Polyester | 0.2 | NCO | 0.2205[a] | 0.2201 | 0.2165 | 0.213 |
| HMDI | 0.365 | | 0.113[b] | | | |
| EDA | 0.1085 | COOH | 0.1086[a,b] | 0.1098 | 0.1083 | 0.1068 |
| PMDA | 0.0543 | | | | | |

[a,b]Calculation was based on the fact that only the reactions according to equations (1) and (2) take place.
[c]The samples were stored in a sealed vessel at room temperature.

What is claimed is:

1. A process for the production of linear, segmented, polyamide ureas having carboxyl groups which are situated directly on the main chain and which are non-statistically arranged comprising reacting polyisocyanates with primary and/or secondary polyamines in the presence of tetracarboxylic acid dianhydrides at a temperature of from 10° to 100° C., the reactants being selected in such a way that from 0.05 to 0.6 acid anhydride groups and from 0.4 to 4 NCO-groups are used per amino group.

2. The process of claim 1, wherein said polyisocyanates are isocyanate-terminated prepolymers and said polyamines are diamines.

3. The process of claim 2, wherein said dianhydride is selected from the group consisting of
(a) Pyromellitic acid dianhydride (1,2,4,5-benzene tetracarboxylic acid dianhydride);
(b) Bicyclo-(2,2,2)-oct-(7)-ene-2,3,5,6-tetracarboxylic acid-2,3:5,6-dianhydride;
(c) Perylene-3,4,9,10-tetracarboxylic acid dianhydride;
(d) Naphthalene tetracarboxylic acid dianhydride;
(e) Tetracarboxylic acid anhydrides of the following formulae

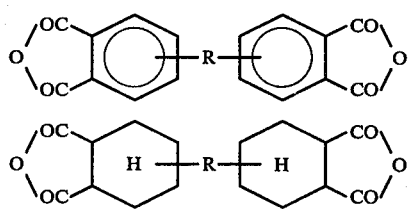

in which R represents a $C_1$–$C_{12}$-alkylene, —CO—, —O—, —S—, —SO$_2$-bridge, the alkylene bridge optionally also containing hetero atoms.

4. The process of claim 2, wherein said dianhydride is selected from the group consisting of pyromellitic acid anhydride, benzophenone tetracarboxylic acid dianhydride, and esters of trimellitic acid anhydride.

5. The process of claim 1 wherein the reaction is carried out at a temperature of from 20° to 60° C.

6. The process of claim 1 wherein the reactants are selected in such a way that from 0.1 to 0.5 acid anhydride groups and from 0.8 to 2.5 NCO-groups are used per amino group during the reaction.

7. The process of claim 1 wherein acetone is used as a solvent during the reaction.

8. A process for the production of aqueous dispersions of linear, segmented, polyamide ureas having carboxyl groups which are situated directly on the main chain and which are non-statistically arranged, said polyamide ureas produced by reacting polyisocyanates with primary and/or secondary polyamines in the presence of tetracarboxylic acid dianhydrides at a temperature of from 10° to 100° C., the reactants being selected in such a way that from 0.05 to 0.6 acid anhydride groups and from 0.4 to 4 NCO-groups are used per amino group, said process comprising converting the carboxyl groups of the polyadduct into carboxylate groups by at least partial neutralization, and dispersing the resulting polyadduct, containing ionic groups, in water.

9. The process of claim 8, wherein said polyisocyanates are isocyanate-terminated prepolymers and said polyamines are diamines.

10. The process of claim 9, wherein said dianhydride is selected from the group consisting of
    (a) Pyromellitic acid dianhydride (1,2,4,5-benzene tetracarboxylic acid dianhydride);
    (b) Bicyclo-(2,2,2)-oct-(7)-ene-2,3,5,6-tetracarboxylic acid-2,3:5,6-dianhydride;
    (c) Perylene-3,4,9,10-tetracarboxylic acid dianhydride;
    (d) Naphthalene tetracarboxylic acid dianhydride;
    (e) Tetracarboxylic acid anhydrides of the following formulae

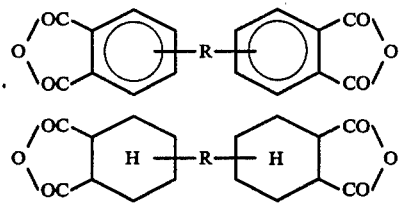

in which R represents a $C_1$–$C_{12}$-alkylene, —CO—, —O—, —S—, —SO$_2$-bridge, the alkylene bridge optionally also containing hetero atoms.

11. The process of claim 9, wherein said dianhydride is selected from the group consisting of pyromellitic acid anhydride, benzophenone tetracarboxylic acid dianhydride, and esters of trimellitic acid anhydride.

* * * * *